United States Patent [19]
Badger et al.

[11] 3,884,724
[45] *May 20, 1975

[54] METHOD OF ACTIVATING STORAGE BATTERIES

[75] Inventors: John P. Badger, Genoa; Herbert A. Bernholtz, Sylvania, both of Ohio

[73] Assignee: Eltra Corporation, Toledo, Ohio

[ * ] Notice: The portion of the term of this patent subsequent to Nov. 17, 1987, has been disclaimed.

[22] Filed: Nov. 12, 1970

[21] Appl. No.: 88,813

Related U.S. Application Data

[63] Continuation-in-part of Ser. No. 733,135, May 29, 1968, Pat. No. 3,540,939.

[52] U.S. Cl................................ 136/114; 136/162
[51] Int. Cl.......................................... H01m 45/00
[58] Field of Search.......... 136/162, 161, 163, 166, 136/181, 6, 112–114

[56] References Cited
UNITED STATES PATENTS

| | | | |
|---|---|---|---|
| 2,773,927 | 12/1956 | Yeoman | 136/166 |
| 3,067,275 | 12/1962 | Solomon | 136/153 |
| 3,304,202 | 2/1967 | Sam | 136/6 |
| 3,540,939 | 11/1970 | Badger et al. | 136/162 |
| 3,591,422 | 7/1971 | Bernholtz et al. | 136/162 |

*Primary Examiner*—Anthony Skapars
*Attorney, Agent, or Firm*—Allen Owen; James D. McNeil

[57] ABSTRACT

A method of activating a storage battery of the water-activable type in which concentrated acid held in semi-solid, granular or liquid form is placed within the battery by the manufacturer and then, at the point of sale is released by the addition of water which combines with the concentrated acid to form the battery electrolyte. The method of this invention utilizes a battery construction in which the stored acid is held in a battery compartment separated from the plates and in which the added water is caused to percolate through the concentrate and is withheld from contact with the plates for a time sufficient to form a battery electrolyte having a predetermined minimum concentration or specific gravity.

2 Claims, 7 Drawing Figures

3,884,724

INVENTORS.
JOHN P. BADGER
HERBERT A. BERNHOLTZ

D Henry Stoltenberg
ATTORNEY

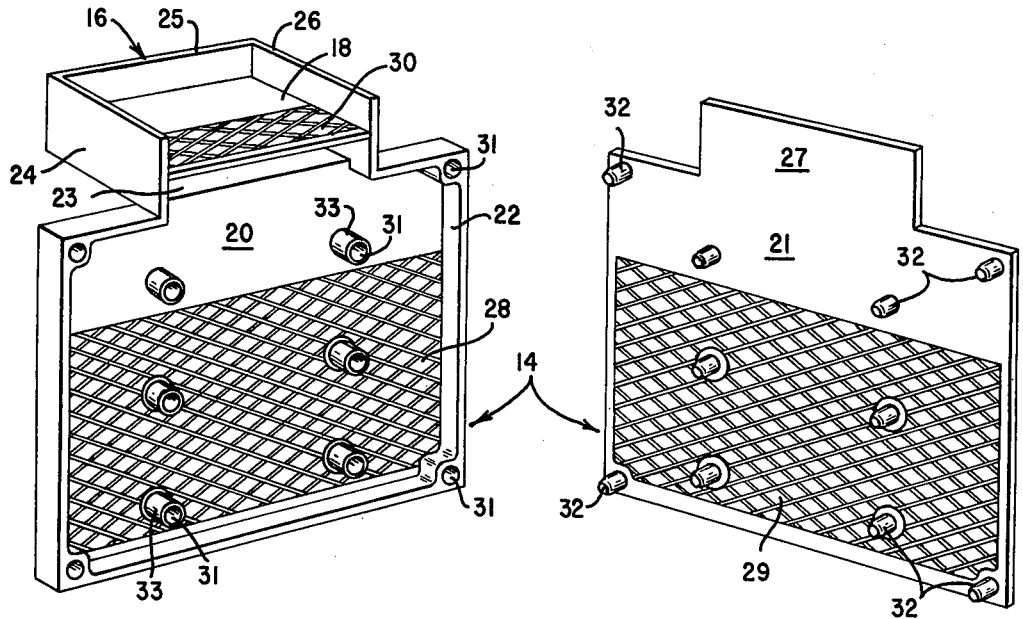
*Fig. 3*  *Fig. 4*
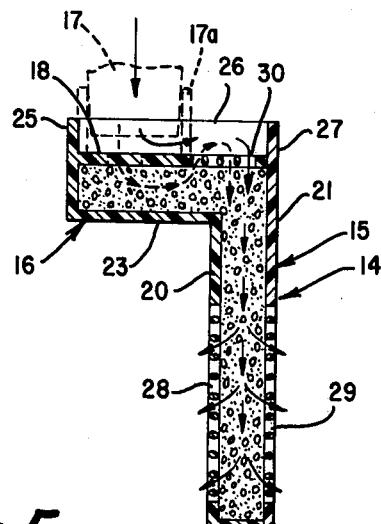
*Fig. 5*

METHOD OF ACTIVATING STORAGE BATTERIES

This is a continuation-in-part of my co-pending application Ser. number 753,135 filed May 29, 1968, now U.S. Pat. No. 3,540,939.

This invention relates to an improvement in water-activable electric storage batteries of the type commonly used in automobiles. It has been recognized that new or replacement dry-charged batteries which can be quickly and conveniently brought to a fully active condition without the necessity of the installer having to handle the battery electrolyte, such as sulfuric acid, are desirable for general use and particularly for use in automative applications.

One type of water-activable battery which eliminates direct handling of the electrolyte includes a frangible or soluble capsule of concentrated sulfuric acid positioned in the battery cells and a means of breaking the capsules or dissolving them when the battery is ready for activation. Batteris of this type, such as are disclosed in U.S. Pat Nos. 2,773,927, 2,832,814 and 3,304,202, suffer the disadvantages in that it is possible that a breakable capsule can be unintentionally broken during shipment, the constructions of the capsules are costly, and, in the case of batteries with frangible capsules, a tool is required to rupture the acid-containing capsules.

Another approach has been to inactivate or immobilize the concentrated sulfuric acid by combining it with a gel-forming or granular-forming agent such as finely-divided silicone dioxide and disposing the immobilized acid above, below or beside the battery plates so that when the battery is ready for activation, water added to the battery will release the acid in the desired form and concentration. This type of battery suffers from the disadvantage that an unacceptably long time is required for the battery to become active, after the addition of water, since the water must diffuse into, and the electrolyte must diffuse from, the mass of immobilized acid.

A number of materials are known in the prior art which are suitable for combining with sulfuric acid to form a water-activable gel or solidified material and are disclosed, for instance, in U.S. Pat. Nos. 3,257,237 and 3,271,199, and British patent specification 913,474. It has been found that the method of this invention of this application is particularly suitable for use with an immobilized acid which has been gelled by the inclusion of selected amounts of colloidal silicon dioxide, which is commercially available in a finely-divided powdered form under the trademark "Cab-O-Sil", from the Cabot Corporation, Boston, Massachusetts. The method of this invention can also be used in a construction in which concentrated acid is held in liquid form in a porous body and is released by the addition of water was described in our co-pending application Ser. number 812,989 filed Apr. 3, 1969, now U.S. Pat. No. 3,591,422.

It is an object of this invention to provide a method of activating a storage battery with the addition of water which includes the steps of entraining the added water upon and within the immobilized acid concentrate for a time sufficient to form battery electrolyte of a predetermined minimum concentration and then releasing the resulting electrolyte to the battery plates. This method may be accomplished through use of a battery construction which requires percolation of the added water through the immobilized acid prior to its entry to the battery plate area.

It is a further object of the instant invention to provide a container for the immobilized acid which directs or channels the flow of water added to the battery through its filler opening such that it will percolate through and make substantial surface contact with the immobilized acid in order to release the concentrated sulfuric acid prior to entering the battery cell.

Other objects and advantages of the instant invention will be apparent to those skilled in the art from the following detailed description of several battery constructions which can be utilized in the practice of the method of this invention, reference being made to the drawings in which:

FIGS. 3 and 4 are views in perspective of the container of FIG. 2, showing how it may be fabricated as a two-piece molded construction which snaps together to provide the container;

FIG. 5 is a cross-sectional view, taken along line 5—5 of FIG. 2, schematically indicating the manner in which water entering the container of this invention is caused to percolate through the immobilized acid within and thence into the interior of the battery cell;

Figure 1:
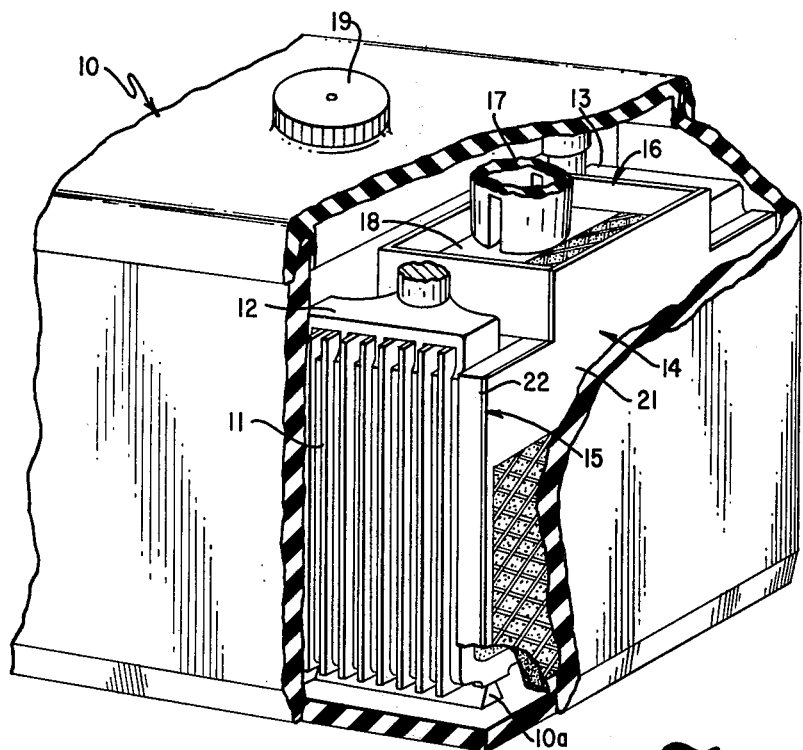
FIG. 1 is a view in perspective of a portion of a conventional electric storage battery, showing the interior construction of a single cell with a container for immobilized battery acid positioned therein.

Referring briefly to FIG. 1, a conventional multiple cell dry charged storage battery 10 is shown with the cutaway section of a single cell illustrated to show the stack 11 of interleaved positive and negative plates. A positive and negative connecting strap 12 and 13 is connected to the respective positive and negative plates on each side of the plate sack 11, and the plates themselves rest upon at least one upwardly-extending rib 10a which is molded on the bottom of the battery case. The container for the acid concentrate, generally designated by reference numeral 14, is dimensioned such that its first or vertical portion 15 will fit between the plate stack 11 and the wall of the battery cell, and such that its second or horizontal portion 16 will overlie the plate stack 11 between the positive and negative connecting straps 12 and 13. A circular flange or filling tube 17 extends from the battery cover around the filler opening downwardly toward the upper surface 18 of the horizontal portion, as shown in FIG. 1. This filling tube 17 is covered by the filler cap 19, as shown on the adjacent cell in FIG. 1.

Referring to FIGS. 3 and 4, the first or vertical portion 15 of the container is formed by a pair of spaced apart, parallel sidewalls 20 and 21, with the wall 20 having a peripheral perimeter 22 extending around it to form an enclosure when the sidewall 21 is attached thereto. The second or horizontal portion 16 of the container includes a bottom plate 23, best seen in FIG. 5, which extends at right angles from the sidewall 20 and the upper surface 18 which is parallel to and spaced apart from the bottom wall 23 by surrounding sidewalls 24, 25 and 26. The bottom plate 23, sidewalls 24, 25 and 26, and upper surface 18 of the second section can be molded as a single unit with the sidewall 20, as illustrated in FIG. 3, while the sidewall 21 includes an upwardly-extending section 27 which, with the sidewalls 24, 25 and 26, forms a complete enclosure having a hollow, generally "L-shaped" interior, as seen in FIG. 5. The upper surfaces of the sidewalls 24, 25 and 26, and the section 27 extend above the top surface 18 of the second or horizontal section 16 to form a continuous peripheral border or cup around the filler tube 17, the function of which will be subsequently explained.

Figure 2:
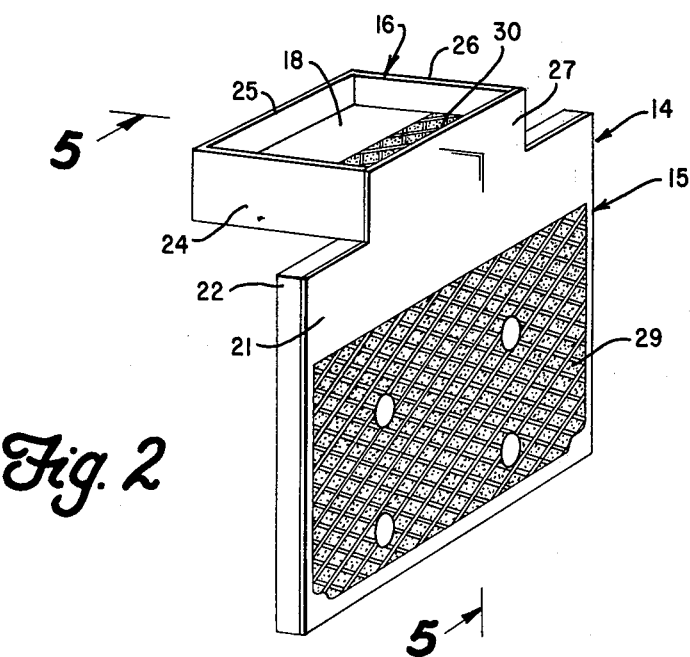
FIG. 2 is a view in perspective of the acid container of this invention.

As shown in this preferred embodiment, both of the walls 20 and 21 include, in their lower areas, a liquid-permeable section which may be a screen or mesh 28 and 29 molded into the sidewalls. In addition, a portion of the upper surface 18 of the second or horizontal section of the container includes a similar liquid-permeable section 30, as best seen in FIGS. 2 and 3. This liquid-permeable section 30 may be located anywhere in the upper surface 18 and can be substantially coextensive therewith.

The container of the preferred embodiment described above may be conveniently molded from a thermoplastic material, such as polypropylene or polyvinyl chloride, which is acid-resistant and has good structural stabililty. The liquid-permeable sections 28, 29 and 30 can be made from any type of screen which can be molded into the device and preferably can be of the same material, polypropylene or polyvinyl chloride, from which the remaining portions of the container are molded. The sidewalls 20 and 21 in the preferred embodiment contain a plurality of molded recesses 31 and correspondingly positioned pins 32, respectively, which snap together to attach the sidewalls 20 and 21 together. In the interior of the basket, the recesses 31 are formed in spacers 33 which extend from the inside of the sidewalls 20 toward the attached position of the sidewall 21 so that the sidewalls, when snapped together, are prevented from inward or outward collapse by the recesses 31, pins 32 and spacers 33. Other molding compositions, screen compositions, and methods of mechanically attaching together the pieces will be apparent to those skilled in the art and will not be further described in detail.

The size of the openings or mesh size in the liquid-permeable sections 28, 29 and 30 is selected to allow the easy flow of liquid therethrough, but to retain the immobilized electrolyte in its gel or granular form. The desired size will vary, depending upon the desired form of the immobilized acid and should generally be as large as possible to permit free flow of liquid therethrough. If a porous body is used to hold liquid acid within the container area, as disclosed in my co-pending application serial number 812,989 mentioned above, the liquid-permeable sections need not be screens but can merely be passages through an otherwise liquid impervious wall which will direct liquid flow through the porous body and thence into the battery plate area.

The container for the immobilized acid described above is used and functions as follows. During the manufacture of the battery, the acid gel or concentrated acid in other non-liquid form is placed within the enclosed areas of the container half shown in FIG. 3 and then the half section shown in FIG. 4 is attached thereto. In some cases, where sufficient gel can be loaded in the vertical section, it is unnecessary to load the interior of the horizontal section with acid gel so that this space will quickly fill with water to act as a reservoir which will be drained into and through the rest of the container through the gel. When using the immobilized acid in gel form, it is desirable to provide flow paths through the mass by extruding alternate criss-cross layers or strips of irregular cross section within the container so that water will readily flow therethrough and will contact maximum gel surface. Alternatively, immobilized acid in the gel form may be frozen so that it can be crushed or ground, or otherwise divided into particles of the desired size. The frozen particles can be easily loaded into the acid containers, and, after thawing, the gel remains porous, so that the interstices between the grains provide flow paths.

The assembled basket is then placed within the battery in the manner shown in FIG. 1 and the battery is stored and shipped in this state. It may be desirable to provide a seal over each of the vents in the battery filler caps 19 to prevent moisture from entering the battery and partially activating the gelled electrolyte, which is hygroscopic. When the battery is ready for service, the cap from the filler opening 19 is removed, the moisture seal is punctured or removed, and the operator pours water through the filler tube opening 17 upon the top of the container. Referring to FIG. 5, the water flow, indicated by the unbroken arrows, is through the screen area 30, downwardly through the first section, and outwardly through the water-permeable areas 28 and 29. Because the uppermost portions of the water-permeable areas 28 and 29 are below a substantially large portion of the acid gel, all water leaving the container has been exposed to a substantial surface area and, thus, has released substantial amounts of the concentrated sulfuric acid prior to entering the battery cell. The residual silicon dioxide substantially remains within the container and will drop to the bottom portion of the container below the lowest edge of the screen areas 28 and 29 and will remain there. This residue will eventually adhere together in cake form and not affect the continued performance of the battery.

The cup or reservoir formed by the upper surfaces of the walls 24, 25 and 26, and the section 27, allows the installer to quickly pour in a relatively large amount of water without waiting for it to percolate through the container.

An alternate design for the container is shown in broken lines in FIG. 5 and which includes a filler pipe 17a molded on the top surface 18 which extends around the flange 17 with an aperture below the pipe 17a in the top surface 18. With this design, water flows from the pipe 17a directly into the container. If water enters at a rate faster than the rate of percolation through the container, it will overflow into the top cup or reservoir and thence drain downwardly, as indicated by the broken arrows in FIG. 5.

Figure 6:
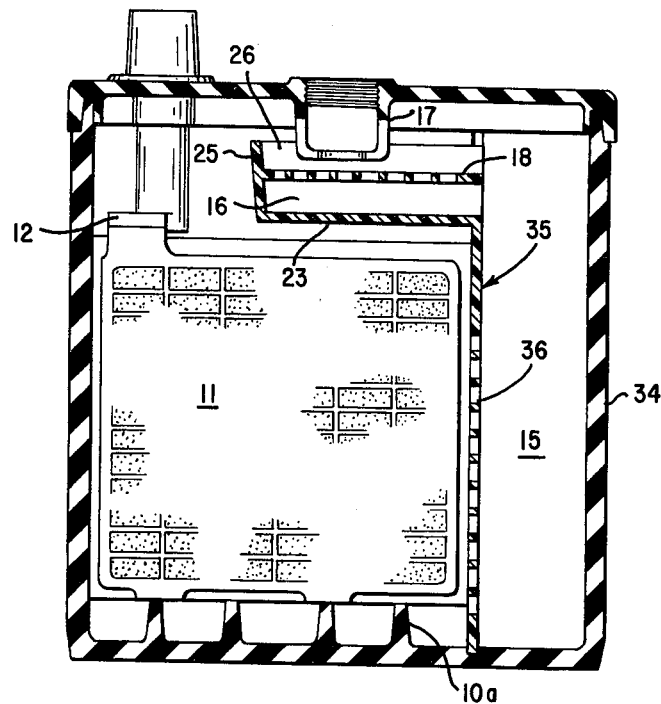
FIG. 6 is a cross-sectional view in elevation of a battery cell, showing another embodiment of the instant invention in which the container for immobilized acid is formed as an integral part of the battery case.

FIG. 6 illustrates an alternate embodiment in which the container is formed as an integral part of the battery casing and is positioned adjacent the ends of the interleaved plate stack 11. This container is similar in shape and function to that previously described and includes a first vertical portion 15 formed by one side 34 of the battery case and a single vertical wall 35 with the water-permeable section 36 therein. The ends of this section 15 are provided by the walls separating the battery cells. The second horizontal portion 16 extends over the plate stack 11 and below the filler tube 17 as previously described. It should be understood that the integral-container of this embodiment can also be positioned parallel to the plate stack 11, similar to the embodiment of FIGS. 1–5, with its end walls of the vertical portion formed by the opposed sides of the battery casing, etc.

Figure 7:
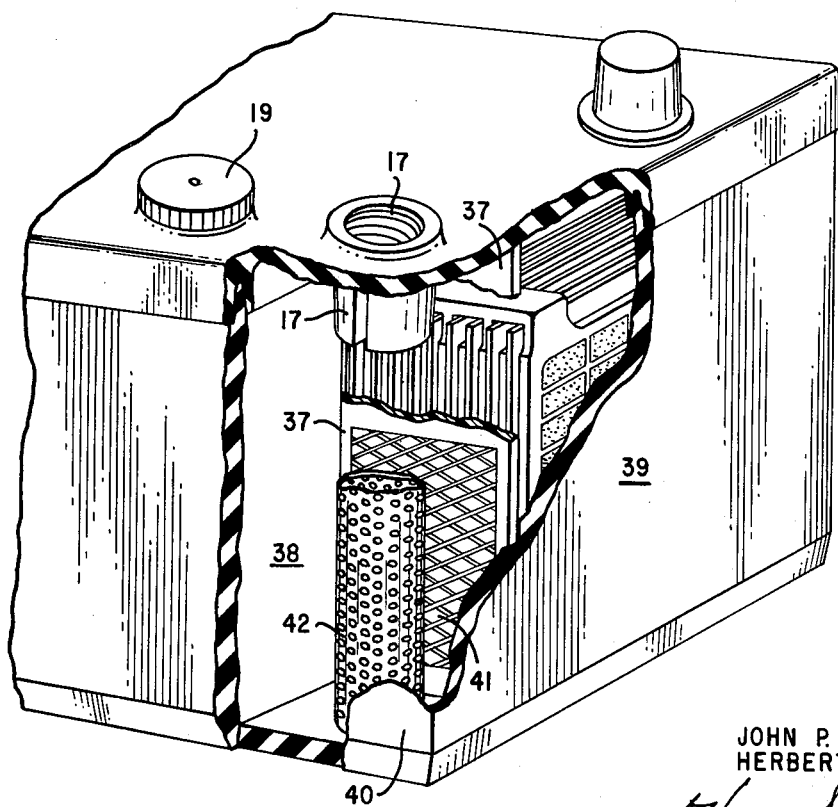
FIG. 7 is a view in perspective of a battery with parts broken away to show still another embodiment in which the container is formed as an integral part of the battery casing.

FIG. 7 illustrates still another embodiment in which the acid gel container is formed by a single partition wall 37 extending adjacent the ends of the plate stack 11 and between opposite walls 38 and 39 of the battery cell with a portion 40 of the battery case forming the enclosure. The water-permeable section 41 is located in the lowermost portion of the wall 37 and the filler opening and tube 17 is positioned to one side of the battery to be over the container. In this embodiment, a perforate tube 42 may extend from the filler tube 17 downwardly to the bottom of the space to provide a water sump for rapid filling. With the concentrated acid held within the container around the perforate tube 42, water therein will flow from all portions of the tube interior through the acid gel and finally through the screen area 41 to the plate stack 11.

In each of the embodiments of FIGS. 6 and 7, the vertical walls 35 or 37, respectively, can be molded as an integral part of the battery case or may be separate inserts which are securely held in position by interlocking slots, etc., or adhesive bonding, or both.

In order to illustrate the advantages accruing from use of the constructions described above and in practicing the method of this invention, a comparison is set forth in Table I below between two 12 volt, 13 plate automotive type storage batteries of equal rating. In battery A, each cell contained a charge of concentrated battery acid (sulfuric acid) positioned in the plate area of the battery. Water was added to fill each cell but was not directed or caused to percolate through the acid concentrate prior to reaching the plates. In battery B, the concentrated acid was again positioned in each cell but such that the added water was directed to or caused to percolate into and through the concentrate in accordance with the principals of this invention. In each test, the batteries were discharged at a rate of 150 amperes at the indicated time in minutes after the water addition.

TABLE I

| Tested Battery | Time After Filling With Water (Minutes) | Battery Voltage at 5 Second Discharge | Time to Drop to One Volt Per Cell, (Minutes) |
| --- | --- | --- | --- |
| Battery A | 20 | 0 | 0 |
|  | 40 | 7.00 | .12 |
|  | 60 | 8.51 | .37 |
|  | 80 | 8.79 | .48 |
|  | 100 | 8.92 | .46 |
|  | 120 | 9.01 | .46 |
|  | 4320 | 10.41 | 3.60 |
| Battery B | 20 | 10.99 | 6.01 |
|  | 20 | 11.00 | 7.79 |
|  | 20 | 11.02 | 7.74 |
|  | 20 | 10.85 | 7.58 |
|  | (Average of 4 tests) | 10.97 | 7.28 |

As seen in Table I above, battery A did not achieve a 5 second discharge voltage level performance comparable to that of battery B until 4320 minutes (66 hours) after water addition and still did not approach the performance of battery B in comparing the time for a given cell to drop to one volt. Similar tests performed on 12 volt, 21 plate automotive type batteries have indicated similar comparative results. In each case, batteries in which the added water is directed into and through the immobilized acid concentrate and thence released to the plate area, in accordance with this invention, exhibit superior results than similar capacity batteries of conventional construction in which water is added directly into the cell without percolation through or entrainment within the acid concentrate so that mere diffusion is relied upon to bring the resulting battery electrolyte up to the desired level of concentration.

Various modifications of the above described preferred embodiments of this invention may be made by those skilled in the art without departing from the scope of the attached claims.

We claim:

1. A method of activating a storage battery of the water-activable type in which concentrated battery acid is retained within each cell in liquid form in a body of liquid absorbent material at a level below saturation in an area remote from the plates in said cell comprising the steps of adding water directly to said body of adsorbent material, retaining said added water in said absorbent body while percolating therethrough, and subsequently releasing the combined water and acid as battery electrolyte to the plates within said cell.

2. A method of activating a storage battery of the water-activable type in which concentrated battery acid is retained in liquid form in a body of liquid absorbent material at a level below saturation in an area remote from the plates of that cell and extending vertically alongside said plates, comprising the steps of adding water directly to the top of said body of absorbent material, retaining said added water in said body by preventing lateral movement into said plate area to cause downward percolation through said absorbent body, and thence releasing said combined water and acid.

* * * * *